May 12, 1970           C. S. PHELAN           3,510,916
DEVICE FOR INSTALLING MOLDED-IN INSERTS IN SANDWICH PANELS
Original Filed June 21, 1965
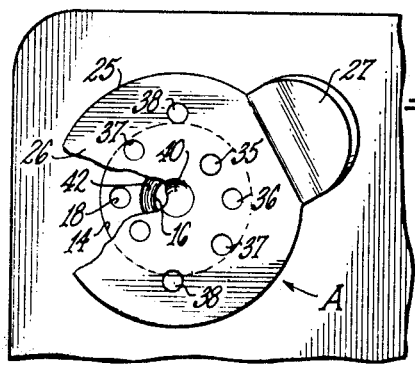
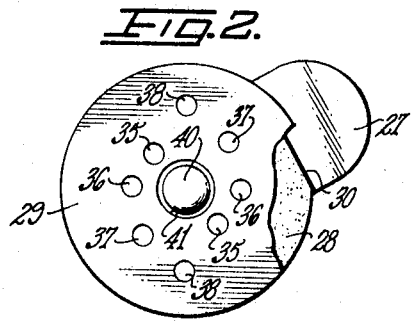
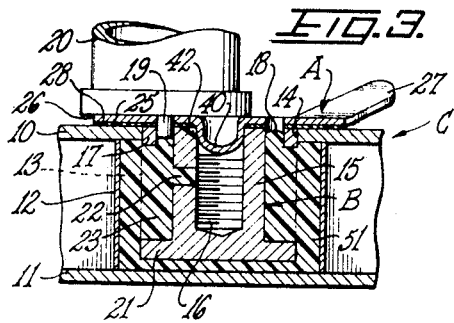
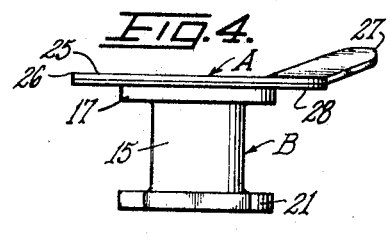
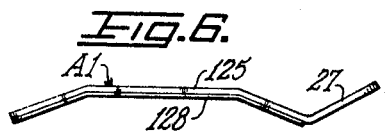
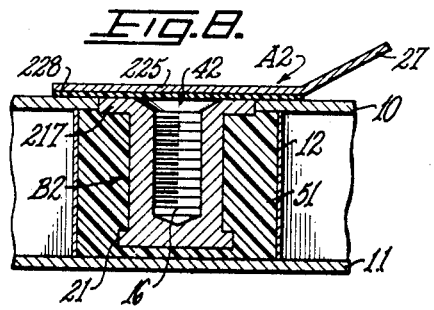
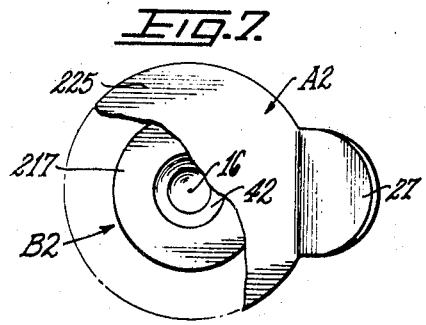
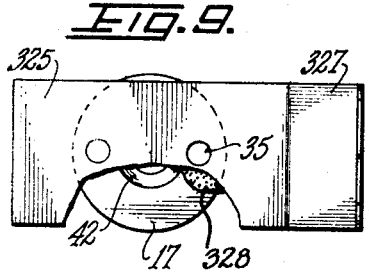
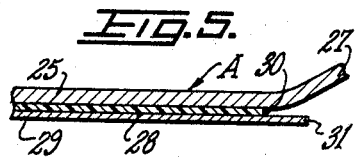
INVENTOR.
CHARLES S. PHELAN
BY
*Lynn H. Latta*
ATTORNEY United States Patent Office 3,510,916
Patented May 12, 1970

3,510,916
DEVICE FOR INSTALLING MOLDED-IN INSERTS IN SANDWICH PANELS
Charles S. Phelan, Tustin, Calif., assignor to Shur-Lok Corporation, Santa Ana, Calif., a corporation of California
Original application June 21, 1965, Ser. No. 465,684, now Patent No. 3,392,225, dated July 9, 1968. Divided and this application Jan. 8, 1968, Ser. No. 696,474
Int. Cl. B29d 3/00
U.S. Cl. 18—36
13 Claims

ABSTRACT OF THE DISCLOSURE

Disclosed herein is a holder for installing a fastener insert in a hole in a lightweight sandwich panel, comprising an adhesive-coated plate which is first adhered to the end of the insert with portions of the holder, including their adhesive-coated faces, projecting beyond the sides of the insert; the insert is then placed in the hole with the projecting portions bridging across the mouth of the hole, and the adhesive faces of these projecting poritions are adhered to the panel at the margin of the hole so as to hold the insert in position in the hole while uncured potting compound is injected past the holder into the hole and is subsequently hardened into a rigid anchoring body securing the insert in the hole.

RELATED APPLICATION

This application is a division of my pending application, Ser. No. 465,684, filed June 21, 1965, now Pat. No. 3,392,225, for Method for Installing Molded-in Inserts in Sandwich Panels.

This invention relates to the installation of fastener inserts in lightweight sandwich panel structure such as is used in the interior walls of airplane cabins, and has as its general object to provide an improved device for positioning and holding an insert in a bored hole in a sandwich panel during injection of potting compound into the hole and hardening of the compound to provide a secure anchorage for the insert.

Various means for installing molded-in inserts have heretofore been proposed and tried, and some of them have been extensively used, but various problems and difficulties have been found to exist wtih respect to all of the prior methods. An early method was to inject a measured quantity of potting compound into the panel hole, and to then press the insert into the body of compound, causing it to extrude upwardly around the insert and to fill the hole. Skill and care were required in the use of this method in order to position the outer end face of the insert flush with the outer surface of the panel and with the axis of the insert exactly normal to said outer panel surface. The requirement for positioning the insert axis at right angles to the panel surface is an exacting one, since if the installed insert is tilted with respect to the panel it will be impossible to insert a fastener bolt in a proper position normal to the plane of the panel.

Subsequent improvement utilized a pair of apertures in the insert head, one for reception of the nozzle of an injection gun and the other for bleeding out of the panel hole the air displaced by the entering compound. In an early use of this method, means was provided to attach the insert to the injection nozzle, and the injection gun was used as a tool to position the insert, but this required holding the gun against the insert until the potting compound was sufficiently set to hold the insert in the position imparted to it by the gun, and thus the method was too slow to be fully satisfactory. A subsequent improvement involved the provision of integral means on the head of the insert to temporarily secure it to the skin sheet of the panel for injection of potting compound and subsequent holding of the insert in the proper position permitting the gun to be immediately withdrawn, and this was found to be a distinct improvement over the prior methods. A general object of the present invention is to attain equally satisfactory positioning of the insert without the necessity for forming the periphery of the insert head with temporary holding means.

Another method that has been tried is to use a temporary attachment device of plastic material resembling a collar button having a stud portion adapted to be threaded into the insert and a flat radially projecting collar for seating against the outer surface of the panel, but such devices have involved a number of problems, including the time involved in threading the stud into the insert and later unthreading it so as to remove the attachment device; the possibility of twisting off the stud and having it remain as an obstruction in the insert bore; the possibility of error on the part of the workman in failing to screw the fastener stud full depth into the insert so as to bring the locating collar into flush engagement with the end face of the insert, resulting in the insert being installed below the surface of the panel; and the possibility of the exothermic reaction of the potting compound, during hardening, causing the body of compound to expand and to lift the locating collar away from contact with the panel, thus causing the insert to be installed above the surface of the panel.

The principal object of the invention is to provide a means for installing molded inserts, avoiding the various problems and objections characteristic of the earlier methods and devices. Toward the attainment of this general object, the invention provides an attachment device:

(1) Of extremely inexpensive construction, adapted to be discarded after one use thereof;

(2) Adapted to provide a temporary attachment of the insert to the panel with a minimum expenditure of time on the part of the workman;

(3) Providing an attachment such as to avoid the possibility of installing the insert either below or above the surface of the panel;

(4) Providing an attachment which will temporarily secure the insert to the panel against either pulling away from the attachment device into the panel hole or being thrust out of the panel hole by expanding potting compound;

(5) Accommodating the injection of compound and the escape of displaced air through apertures in the insert head during the injection of the compound;

(6) Instantaneously removable after the compound has set around the insert.

Other objects and advantages will become apparent in the ensuing specification and appended drawing in which:

FIG. 1 is a plan view of a temporary installation device embodying the invention and illustrating the use of the same in positioning an insert in the hole of a sandwich panel, a portion of the installation device being broken away to show the insert therebeneath;

FIG. 2 is an inverted plan view of the installation device of FIG. 1 with a portion of the adhesive covering removed to show the adhesive therebeneath;

FIG. 3 is a transverse sectional view of a sandwich panel with an insert being temporarily held in position in a hole therein during injection of potting compound;

FIG. 4 is a side elevational view of an insert with the device of the invention attached thereto preparatory to installation in a sandwich panel;

FIG. 5 is a fragmentary sectional view of the installation device on an enlarged scale;

FIG. 6 is a side elevational view of a modified form of the installation device utilized in positioning an insert in a panel having a surface that is not flat;

FIG. 7 is a plan view of an installation device embodying another modified form of the invention, partially broken away to show an insert attached thereto;

FIG. 8 is a transverse sectional view of the installation device of FIG. 7 illustrating its use in installing an insert in a sandwich panel; and FIG. 9 is a plan view of an installation device embodying a further modified form of the invention, partially broken away to show an insert attached thereto.

Referring now to FIGS. 1–5 of the drawing in detail, I have shown therein as an example of one form in which the invention may be embodied, an installation device consisting of a holder A adapted for use in positioning an insert B of the type having apertures in its head for the injection of potting compound, into a sandwich panel C of a well known type comprising a pair of skin sheets 10 and 11 secured to the opposite faces of a low-density honeycomb core 12 consisting of a plurality of strips of metal foil or other thin lightweight material which have been formed by bending and then attached together so as to provide a plurality of honeycomb cells extending transversely to the sheets 10 and 11. In preparation for the installation of an insert, a hole 13 is bored or punched through at least one of the skin sheets (e.g., sheet 10 as shown) and through the core 12 and (in most cases) having one end closed by the skin sheet 11 providing a bottom therefor.

The insert B shown in FIG. 3 is of a well known type comprising a tubular body 15 which may have either a threaded, closed bottom bore 16 therein or in, alternatively, a smooth cylindrical bore extending through both ends of the insert so that a bolt may be passed entirely through the panel and through the insert. The insert B has an outer end provided with a radial flange-like head 17 (FIG. 4) contoured to fit snugly within the opening 14 in the skin sheet 10 which constitutes the outer end of the hole 13, and having therein a pair of apertures 18 one of which is adapted to bleed air from the hole 13 while the other one is adapted to receive the nozzle 19 of an injection gun 20 through which potting compound 21 is injected into the hole 13. At this point it may be noted that the hole 13, where it passes through the core 12, is defined by the cut or curled-over edges of the thin honeycomb walls of the core, and that the undisturbed residual portions of the cell walls around the hole will be largely positioned radially outwardly of the cut or bent edges of the cell walls which define the hole, whereby such residual portions of the cells will define pockets extending beyond the diameter of the hole 13 and which become filled with peripheral portions of the body of potting compound which extend beyond the margin of skin sheet aperture 14, thus securely locking the anchoring body within the panel. The insert B further includes an inner end provided with a non-circular head 21 or other equivalent means providing torque-anchorage of the insert in the body of potting compound to resist rotation of the insert when a stud or other threaded device is screwed into the threaded hole 16. The insert may also include a suitable thread-lock device 22 which however has no bearing upon the present invention.

The holder A comprises an attachment body or bridge 25 of thin sheet material which is preferable in the form of a circular disc as shown, conforming to the periphery of the insert head 17 but of greater diameter so as to provide a projecting marginal portion 26; together with an integral tab 27 extending from one side of the bridge 25 and adapted to be grasped between a thumb and finger for manipulating the device. In order to facilitate grasping the tab 27, it is preferably bent at a dihedral angle with reference to attachment body 25 as shown best in FIG. 4, although it is possible to have the tab 27 disposed in the plane of the body 25 in which case it can be lifted by inserting a fingernail or a knife blade beneath it.

The under surface of the bridge 25 is provided with a coating of pressure-sensitive adhesive 28 of a tenacious character such as to provide an attachment of good holding power. The central area of this adhesive is applied to the end face of the insert head 17, to securely attach the bridge to the insert, and the peripheral area of adhesive covering the marginal portion 26 of the bridge 25 is adapted to provide a strong attachment to the skin sheet 10 of the panel which will resist outward displacement of the insert by exothermic expansion of the body of potting compound 21.

The adhesive coating 28 is covered by a removable cover sheet 29 which is stripped off in preparation for using the device. Adhesive coating 28 is preferably of the same area as the body 25, having a chordal side 30 where it joins the tab 27. The cover sheet 29 can be fully circular, thus having a small area thereof projecting beyond the chordal margin 30 at 31, so as to make it easy for the thumbnail to be inserted between the projecting portion 31 and the tab 27 to facilitate grasping the edge of the cover sheet 29 for stripping it away from the adhesive coating 28.

A plurality of pairs of apertures 35, 36, 37 and 38 are punched through the bridge 25 and the adhesive coating 28, in positions adapted to register with the apertures 18 of inserts B of varying sizes, the apertures of each pair being spaced equidistantly on opposite sides of the axis of the insert on a diameter thereof, the apertures 35 being of minimum spacing and the apertures 36, 37 and 38 being successively increased spacing so as to provide for use with inserts in a range of sizes between relatively small and relatively large.

In the particular arrangement shown, the apertures of successively greater spacing are arranged in groups spiraling outwardly from the center of the device, with the apertures of successively greater spacing being arranged in corresponding succession in the groups. Other selected arrangements, without necessarily having the arrangement of increased spacing correspond to the arrangement of succession in a group of apertures, can be employed. The invention contemplates the possibility of utilizing an attachment bridge having a single pair of apertures, or having 2, 3, 4 or more pairs, although an arrangement approximately as shown is preferred in order that a single device may be adapted for use with at least four different sizes of inserts. A group of apertures of one range of spacing can be utilized in on installation device and a second installation device, which can be of a different size, can be utilized for a group of apertures having a different range of spacing.

The aperture pattern 35–38 can be either no apertures at all, one, two, or a plurality arranged in a manner to provide the optimum number of aperture patterns in a single installation device.

The bridge 25 is preferably provided with a pilot dimple 40 in its center and in centered relation to the groups of apertures 35–38 on respective sides thereof, for locating reception in the outer end of threaded hole 16 (normally having a countersunk thread lead 42) thus centering the bridge in coaxial relation to insert B and making it possible to register the proper pair of apertures 35–48 with the insert apertures by rotating the installation device A around the pivotal connection thus established. Dimple 40 can project through a central opening 41 in the cover sheet 29 (FIG. 2). The dimple will engage the hole 16 or thread lead 42 of the insert and is of a suitable size such as will preclude intimate dragging contact between the insert head and the adhesive surface which would cause interference with the rotational adjustment of the device for aperture alignment, but will yield to pressure forcing it into hole 16 and the bridge 25 into secure adhesive attachment to the insert head. Alternatively, the bridge can be uniformly flat and indimpled, as in the installation device A2 of FIG. 8.

While the attachment bridge 25 is fabricated of relatively thin material within the range of thicknesses commonly designated "sheet," and much thinner than the materials commonly designated as "plate," the area of the body is sufficiently small (corresponding to the relatively small end area of the average insert) so that the body as a whole is relatively rigid and not easily bent. To designate these characteristics in the appended claims, in preference to utilizing the broad general term "body" I have used in the appended claims the terms "bridge" and "plate form" to indicate that the attachment body is relatively stiff and resistant to bending and is of substantially uniform thickness throughout is area and yet has a relatively large face area in comparison to its thickness.

For the common type of insert with a flat outer end face, and where the face of the panel is flat, the bridge 25 of the installation device is flat as shown in FIGS. 1–5. On the other hand, where the insert to be installed in a curved panel or one having a surface that is not flat, the bridge 125 of an attachment device A1 can be curved or of channel form or otherwise bent as shown in FIG. 6 to conform to the surface contour of the panel, but if the insert that is to be installed in such a panel has a flat end face, the central portion of the bridge 125 will be flat as shown.

Where an insert B2 with a non-apertured head 217 is installed by the method of first injecting a measured quantity of potting compound into the panel hole, the attachment bridge 225 and its coating 228, of installation device A2 can be of plain disc form without apertures, as shown in FIGS. 7 and 8.

Although the circular shape is preferred in order to provide maximum support extending uniformly around the circumference of the insert head, the invention contemplates the possibility of utilizing other shapes such as the rectangular, insert body 325 as shown in FIG. 9, which can consist simply of a strip of material having a correspondingly rectangular adhesive coating 328 on its underface as shown in FIG. 9. The tab 327 can be correspondingly rectangular, square, triangular, hexagonal, octagonal, oval or of any other shape suitable for the tab form selected.

OPERATION

My improved method of installing an insert is rapid and effective and substantially foolproof. The covering 29 is stripped off the face of adhesive coating 28 and the insert body is then positioned over the head 17 of the insert with the appropriate pair of apertures 35, 36, 37 or 38 lined up with the apertures 18 of the insert head. If the workman is unable to do this simply by eye-sighting, he can insert a pointed locating rod or fork through the pair of apertures in the attachment device and thence into the apertures 18 of the insert head, thus positively locating the attachment device in the proper position over the head. When the device is properly located, its adhesive coating 28 is pressed firmly against the end face of the insert head 17 so as to attach the device to the insert as shown in FIG. 4. The attachment device can then be used as a holder to project and fit the insert into the hole 13, and as the insert reaches the proper depth in the hole, the adhesive coating 28 will establish contact with the panel skin 10 and the projecting marginal portion 25 of the device is then pressed firmly against the skin 10. Thus the insert is properly positioned with its outer face exactly flush to the outer surface of the skin 10 and with the insert axis normal to said surface.

The injection gun 20 is then applied to insert its nozzle 19 through an aperture in the attachment device A and into a registering aperture 18 of the insert head 17, and the gun can then be immediately operated to inject the potting compound 21 into the hole 13 until it appears in the other aperture 18, thus indicating the filling of the hole. During such injection, it is possible to press the nozzle end of the gun firmly against the attachment device A with the thickness of the attachment device interposed between the gun and the skin sheet 10, without tending to depress the attachment device below its normal flat plane.

As soon as the hole is filled with potting compound, the gun is removed and the operator proceeds immediately to the installation of another insert, leaving the insert B supported by the attachment device A until the potting compound 21 has hardened around the insert. Subsequently, the operator removes the attachment device A by simply grasping the tab 27 and stripping the device A away from the assembly of panel and insert. Any adhesive that may remain adhering to the outer face of the panel can subsequently be readily removed by wiping the surface with a cloth impregnated with a solvent for the adhesive.

I claim:

1. A device for installing a molded insert having a head into a hole in a sandwich panel with the insert head filling the outer end of said hole and flush with the outer face of the panel, said device comprising a bridge having an area larger than the outer end face of said head and having an adhesive coating on its under face, adapted to be adhesively attached to said outer end face of the insert with portions of the bridge projecting beyond the periphery of said head and adapted to be adhesively attached to the outer surface of said panel, whereby said insert may be inserted into said panel hole with said outer end face thereof flush with the outer face of the panel and with the axis of the insert normal to said outer panel face.

2. An insert installation device as defined in claim 1, including a tab projecting from one side of the periphery of said bridge and adapted to be grasped for stripping the device away from a panel and insert assembly.

3. An installation device as defined in claim 1, wherein said bridge is imperforate, for use in connection for an inset having an imperforate head adapted to be inserted into a body of potting compound previously injected into a panel hole.

4. An installation device as defined in claim 1, wherein said bridge is in the form of a elongated strip having end portions adapted to project from opposite sides of the insert head.

5. An installation device as defined in claim 1, wherein said bridge is flat throughout its area.

6. An installation device as defined in claim 1, wherein said bridge is of channel form to fit the contour of a non-flat panel face.

7. A device for installing a molded insert having a head provided with a pair of apertures, into a hole in sandwich panel, and for supporting said insert in said hole during injection and hardening of a body of potting compound into said hole through one of said apertures and around said insert, with the insert head filling the outer end of said hole and flush with the outer face of the panel, said device comprising a bridge of plate form having an area larger than the outer end face of said insert head so as to provide portions of said bridge adapted to project beyond the periphery of said head with said outer end face registering with an intermediate area of said bridge, said bridge having an adhesive coating covering its underface including said intermediate portion, for attachment thereof to said outer end face of the insert, and including the projecting portions of said bridge, for adhesive attachment to the outer face of said panel around said hole, whereby said insert may be supported in said hole with said outer end face flush with said outer panel face and with its axis normal to said outer panel face.

8. An insert installation device as defined in claim 7, wherein said bridge is of circular disc form and of larger diameter than said insert head so as to embody said projecting portions in an annular area surrounding the periphery of said head.

9. An insert installation device as defined in claim 8, including a pair of apertures extending through said bridge and said adhesive coating for registration with said insert head apertures.

10. An installation device as defined in claim 9, wherein there are a plurality of said pairs of apertures of graduated spacing from the center of said bridge for selective registration with pairs of apertures in the heads of inserts of varying sizes.

11. An insert installation device as defined in claim 10, wherein said apertures of said bridge are arranged in diametrically opposed groups, each group comprising a series of apertures arranged in spiraling relation to the center of the bridge, with successively greater radial spacing from said center.

12. An installation device as defined in claim 7, wherein said adhesive coating is of pressure-sensitive adhesive material, and including a cover sheet normally adhering to and covering said coating.

13. An installation device as defined in claim 7, including a tab formed integrally with said bridge at one side thereof and defining an obtuse dihedral angle with said bridge, whereby it can be readily grasped for stripping said bridge from an assembly of insert and panel after an insert has been securely anchored in the panel.

References Cited

UNITED STATES PATENTS

| | | | |
|---|---|---|---|
| 3,016,578 | 1/1962 | Rohe | 52—617 |
| 3,217,363 | 11/1965 | Rohe | 18—36 X |
| 3,392,225 | 7/1968 | Phelan | 18—36 X |

J. HOWARD FLINT, JR., Primary Examiner

U.S. Cl. X.R.

249—97; 52—617; 264—262; 161—406